Feb. 28, 1961    SHAFI-UDDIN A. CHOUDHURY ET AL    2,973,467
DYNAMIC BRAKING OF INDUCTION MOTORS
Filed April 6, 1960
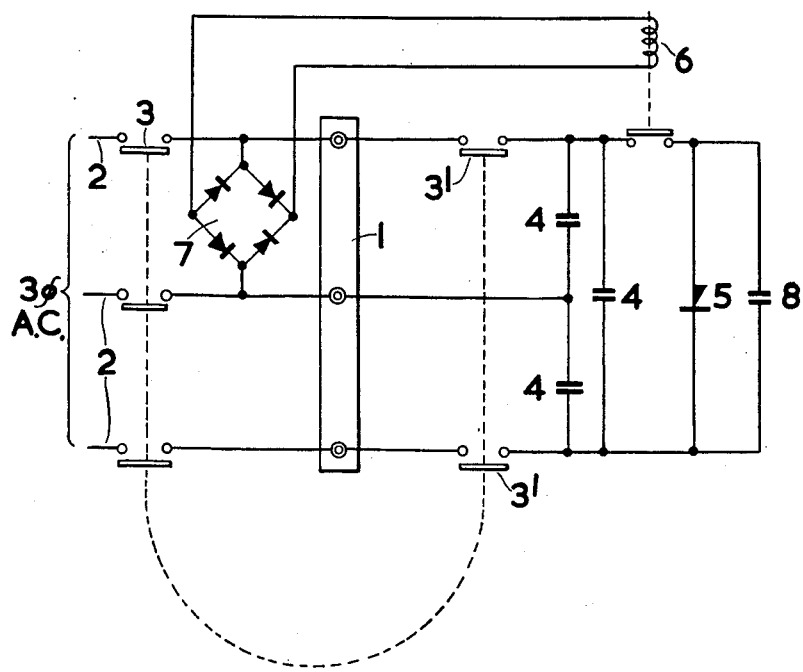
INVENTORS
SHAFI-UDDIN A. CHOUDHURY
JOHN WHITCROFT
ATTORNEY United States Patent Office 2,973,467
Patented Feb. 28, 1961

2,973,467

DYNAMIC BRAKING OF INDUCTION MOTORS

Shafi-Uddin Ahmed Choudbury, Rugby, and John Whitcroft, Lilbourne, Rugby, England, assignors to Associated Electrical Industries Limited, London, England, a British company Filed Apr. 6, 1960, Ser. No. 20,331

Claims priority, application Great Britain Apr. 10, 1959

5 Claims. (Cl. 318—211)

This invention relates to the application of dynamic braking to an induction motor.

It is known to apply dynamic braking to an induction motor by connecting across the primary winding of the motor, after the supply has been disconnected therefrom, a capacitor, the function of which is to cause self-excitation of the primary winding by the continued rotation of the secondary winding of the motor as a result of the inertia of the load connected thereto, and to connect across the capacitor a rectifier in order to produce a direct current component in the self-induced alternating current induced in the primary winding by the connection of the capacitor thereto. During the initial stages, dynamic braking of the alternating current in the primary winding produces the major braking effect, but as the frequency of the induced alternating current diminishes with the slowing down of the rotor, the braking effect also diminishes; it is then that the direct current component becomes more effective. However, if the kinetic energy stored in the rotor as a result of the load connected thereto is considerable, it has been found difficult to bring the rotor finally to rest since the rotor and the load continue to rotate at a low angular velocity.

According to the present invention, dynamic braking of an induction motor is effected by connecting at least one capacitor across the primary winding of the motor after the supply has been disconnected therefrom, and providing relay means responsive to the self-excitation voltage developed across the primary winding (or a portion thereof) for connecting, in shunt with the capacitor (or one of them), a rectifier, a further capacitor, or both a rectifier and a further capacitor only when the self-excitation voltage has fallen to a predetermined value.

The effect of connecting a further capacitor across the primary winding of the motor is to increase the value of the capacitance through which the self-excitation voltage is caused to flow in the primary winding as the frequency of the self-excitation voltage diminishes as a result of the reduced angular velocity of the rotor. The increased capacitance thus causes the circuit including the primary winding and the capacitance in shunt therewith to be brought more nearly into a state of resonance at the frequency of the self-excitation voltage. Preferably, the value of the capacitance initially connected to the primary winding is such that its reactance is comparable with the short-circuit reactance of the primary winding at the supply frequency. The further capacitor preferably has a value at least ten times that of the self-excitation capacitor(s).

If the relay means is utilised to connect a rectifier only in shunt with the capacitor(s) initially connected across the primary winding of the motor, the effect is then to delay the injection into the primary winding of a direct current component of the self-excitation voltage until the angular velocity of the rotor has diminished to a value at which that component becomes most effective.

In this way, the introduction of the direct current component is made independent of the inertia of the rotor of the motor, and that of any load which may be mechanically connected thereto. This is consequently an improvement over a previously known arrangement in which a relay, maintained energized by the supply voltage to the primary winding of the motor and de-energized simultaneously with the disconnection of such supply, was given a predetermined time delay, estimated to be sufficient to allow the speed of the motor to diminish to about ⅓ of its synchronous speed, before its contacts closed to connect a charged capacitor across the terminals of the primary winding of the motor. Obviously, when a load of considerable inertia is involved in the prior arrangement, the introduction of a direct current discharge through the primary winding would occur before the speed had dropped to a value at which such discharge is more effective.

Preferably the relay means is arranged to connect both a rectifier and a further capacitor in shunt with the self-excitation capacitor(s). The further capacitor is then charged by the self-excitation voltage appearing across the rectifier in the alternate half-cycles when the rectifier is non-conducting, and subsequently discharges through the primary winding.

Preferably the relay is a direct current relay and is operated by connecting a rectifier permanently across the primary winding, the relay being thereby normally held in the open position by the voltage applied to the primary winding, the relay closing to connect the rectifier across the capacitor (or one of them) only when the voltage developed across the primary winding under dynamic braking conditions has fallen to a predetermined value. The rectifier utilised to supply current to the operating winding of the relay is required only to have a low current rating so that the fact that it is normally connected to the supply whilst the motor is in operation does not impose more than a small load on the supply.

A circuit arrangement in accordance with the invention is illustrated in the accompanying drawing as applied to a three-phase induction motor.

Referring to the drawing, the motor is shown at 1. It is connected to a three-phase supply 2 by way of a contactor 3, the contacts of which are closed when the motor is to be operated. Also connected to the terminals of the motor are capacitors 4, one being connected across each phase of the primary terminals of the motor. Contactor 3 is provided with additional contacts 3′ which are closed when the contacts 3 are open and vice versa. Thus, when the contactor 3 is closed to connect the supply to the motor contacts 3′ are open, contacts 3′ only closing to connect the capacitors 4 to the terminals of the motor when the contactor is open to disconnect the supply 2 from the motor 1. Capacitors 4 are the self-excitation capacitors.

Across the capacitors 4 is connected a rectifier 5 by way of the contacts of a voltage operated relay 6. The operating winding of the relay 6 is energised by a bridge rectifier 7 connected across two phases of the supply on the motor side of the contactor 3. Contacts of relay 6 are normally open when the supply is connected to the motor, the contacts closing only when the voltage across the terminals of the motor falls to a predetermined value. Rectifier 5 is shunted by a capacitor 8.

Capacitors 4 may each have a capacitance comparable with the short-circuit reactance of the motor at the supply frequency, while capacitor 8 has a value at least ten times that of each of the capacitors 4.

When the supply to the motor is disconnected by opening contactor 3, contacts 3′ close to connect the capacitors to the terminals of the motor 1. The contacts 6 of the relay are maintained open by the continued energisation of the winding by the self-excitation voltage developed in the primary winding of the motor by the connection of capacitors 4. When the self-excitation voltage diminishes to a predetermined value as a result of the reduction in the angular velocity of the motor and of the load connected to its rotor, contacts of relay 6 close to connect the rectifier 5 across the capacitors 4. A direct current component is then produced in the primary windings of the motor. At the same time a voltage is built up across the capacitor 8 and as the self-excitation voltage reduces as the machine slows down the capacitor 8 discharges through the primary windings of the motor to bring the rotor to rest.

While it is convenient for capacitors 4 to have the value above indicated, it is to be realised that for the purpose of commercial expedience it will be usual to provide capacitors of a single compromise value suitable for a given range of motors, rather than using a different value of capacitor for each individual motor. This enables a control panel containing the relay, the capacitor (and the rectifier, if used), to be made which can be supplied for use with any one of a range of sizes of motor.

What we claim is:

1. A system for effecting the dynamic braking of an induction motor, comprising means for connecting at least one capacitor across the terminals of the primary winding of the motor after the supply has been disconnected therefrom, and relay means responsive to the self-excitation voltage developed across at least a portion of the primary winding for connecting, in shunt with said capacitor, additional means for increasing the dynamic braking of the motor when the self-excitation voltage of the motor has diminished to a predetermined value.

2. A system for effecting the dynamic braking of an induction motor, comprising means for connecting at least one capacitor across the terminals of the primary winding of the motor after the supply has been disconnected therefrom, and relay means responsive to the self-excitation voltage developed across at least a portion of the primary winding of the motor for connecting, in shunt to said capacitor, a further capacitor of higher value than said one capacitor to increase the value of the shunt capacitance to a reactance such as to bring said primary winding and said shunt capacitance to resonance at the frequency of said self-excitation voltage.

3. A system for effecting the dynamic braking of an induction motor as claimed in claim 2, in which said relay means is constituted by a direct current relay energised by said self-excitation voltage through a full-wave rectifier.

4. A system for effecting the dynamic braking of an induction motor, comprising means for connecting at least one capacitor across the terminals of the primary winding of the motor after the supply has been disconnected therefrom, and relay means responsive to the self-excitation voltage developed across at least a portion of the primary winding of the motor for connecting, in shunt to said capacitor, a further capacitor shunted by a rectifier in order to increase the dynamic braking effect on said motor.

5. A system for effecting the dynamic braking of an induction motor as claimed in claim 4, in which said relay means is constituted by a direct current relay energised by said self-excitation voltage through a full-wave rectifier.

No references cited.